United States Patent [19]

Shikano et al.

[11] 4,280,844

[45] Jul. 28, 1981

[54] REFRACTORY BRICK FOR MOLDING MOLTEN STEEL

[76] Inventors: Hiroshi Shikano, 9-40 Kobai 4-chome, Yahata Nishi-ku, Kita Kyushu-shi, Fukuoka-ken; Toshihiko Iwata, 14-30 Shinozaki 5-chome, Kokura Kita-ku, Kita Kyushu-shi, Fukuoka-ken, both of Japan

[21] Appl. No.: 89,032

[22] Filed: Oct. 29, 1979

[30] Foreign Application Priority Data

Nov. 7, 1978 [JP] Japan ................ 53-136279

[51] Int. Cl.³ ............................. C04B 35/52
[52] U.S. Cl. ...................... 106/56; 106/58; 106/65
[58] Field of Search ............... 106/56, 58, 65

[56] References Cited

U.S. PATENT DOCUMENTS

| | | | |
|---|---|---|---|
| 2,709,659 | 5/1955 | Werking | 106/56 |
| 2,741,822 | 4/1956 | Udy | 106/58 |
| 3,842,760 | 10/1974 | Parsons et al. | 106/56 |
| 4,072,531 | 2/1978 | Funabiki et al. | 106/56 |
| 4,102,694 | 7/1978 | Sasaki et al. | 106/56 |

*Primary Examiner*—James Poer
*Attorney, Agent, or Firm*—Pearne, Gordon, Sessions, McCoy & Granger

[57] ABSTRACT

A spalling- and corrosion-resistance refractory which comprises the composition of refractory material consisting of at least one refractory inorganic substance, 1–30% by weight of low melting point metal powder such as aluminum powder having a particle size below 0.5 mm and 2–15% by weight of thermo-setting organic binder such as phenol resin based on the total weight of the refractory material, respectively.

The spalling- and corrosion-resistance refractory is prepared by admixing the refractory material, aluminum powder and phenol resin binder, kneading and molding the mixture and finally burning the green brick at a temperature below 800° C.

2 Claims, 1 Drawing Figure

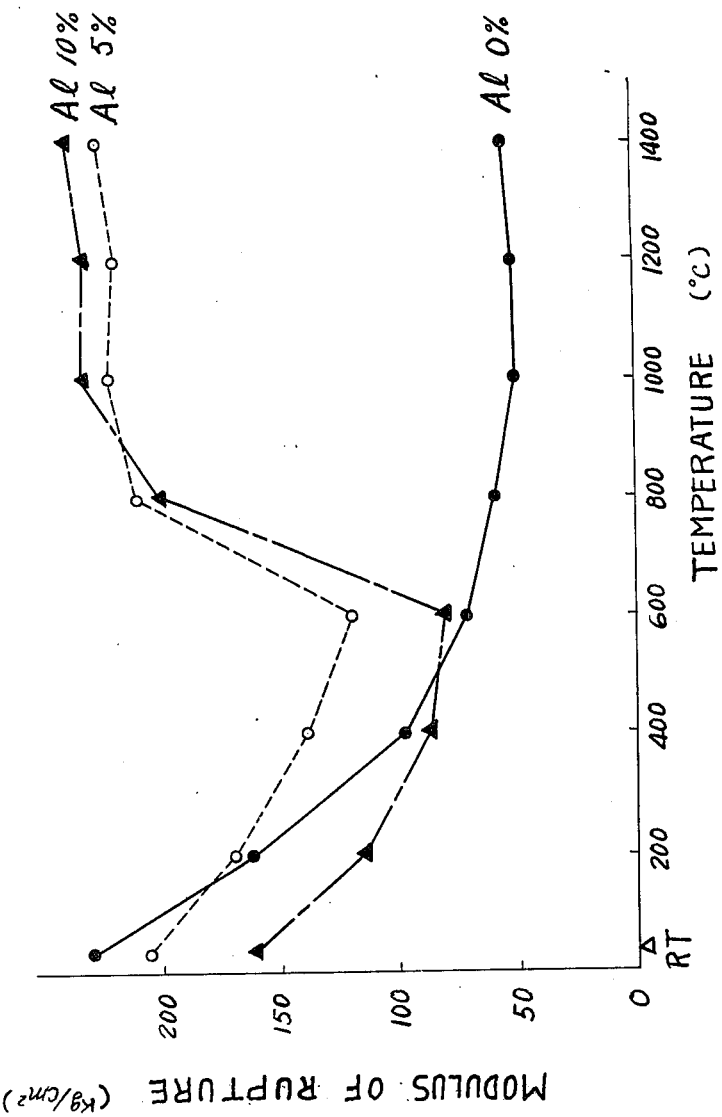

REFRACTORY BRICK FOR MOLDING MOLTEN STEEL

BACKGROUND OF THE INVENTION

This invention relates to refractories which contain an organic binder and metal powder of low melting point in the composition thereof in addition to a conventional refractory inorganic material and which is prepared by burning the refractory composition in the temperature range of 100° C. to below 800° C. to thereby achieve energy saving in the production of such refractories.

In the past, bricks produced by burning the brick composition in the temperature range of 1300° C. to 1800° C. have been generally employed as refractory bricks. However, from the view point of energy saving and cost reduction in the production of such refractory bricks partly, unburnt bricks containing an inorganic or organic binder in the composition thereof as well as the other brick components have been employed as linings on a limited area of the inner surface of a steel refining furnace. However, the use of such unburnt bricks containing the inorganic or organic binder on the steel refining furnace presents several problems as will be described hereinbelow.

When the inorganic binder is employed in the composition of unburnt bricks adapted to be used on a steel refining furnace, the binder will possibly tend to become a source of impurities which adversely affect the quality of a steel to be produced in the furnace and furthermore, the binder in the brick composition tends to reduce the refractoriness of the brick and in consequence, the brick is easily damaged by the molten steel charge and the slag generated in the refining operation in the furnace.

When the organic binder is employed in the composition of nonburnt bricks adapted to be used on a steel refining furnace, the binder decomposes by oxidation under high temperature condition present in the furnace in operation and loses the bonding power called for the binder resulting in substantial reduction of the strength and deterioration of the brick. Therefore, the brick wears away on the side thereof facing the furnace charge and decreases strength by oxidation on the side thereof opposite from the charge facing side.

Therefore, the prior art nonburnt bricks have been employed at limited areas of a structure which is to be lined by the bricks where the bricks are employed under not severe conditions and specific steels are refined under specific furnace operation conditions.

SUMMARY OF THE INVENTION

Therefore, one object of the present invention is to provide refractories which can effectively eliminate the disadvantages inherent in the prior art burnt and unburnt refractories which employ an organic or inorganic binder referred to hereinabove.

Another object of the present invention is to provide refractories which contain an organic binder and exhibit an improved strength when employed in the application where the organic binder bonds between the brick components.

The above and other objects and attendant advantages of the present invention will be more readily apparent to those skilled in the art from the reading of the following detailed description by way of preferred embodiments of the present invention.

BRIEF DESCRIPTION OF THE DRAWING

The sole FIGURE of the accompanying drawing is a graph which shows the effect of flaky aluminum powder additive on the modulus of rupture of refractory.

PREFERRED EMBODIMENTS OF THE INVENTION

The term "organic binder" employed herein is used to include all thermo-setting organic binders, but phenol resins have been widely employed because of low cost and high carbonization yield.

Since organic binders generally begin to decompose by oxidation under oxidation conditions at a temperature in the vicinity of 300° C. and disappears at temperatures in the range of 500° C. to 700° C., in the prior art unburnt bricks in which the bonding of the components in the brick composition solely relies upon the binder, the unburnt brick exhibits a substantial deterioration of the required brick properties at a temperature in the vicinity of 700° C. Thus, in order to improve the strength of unburnt bricks, according to the present invention, the composition of the unburnt brick is added thereto a material which is expected to be present in the composition in the form of a single substance or compound even at temperatures above 1,000° C. and the bonding function of the additive material particles is effectively utilized to thereby reinforce the brick.

As additive materials which satisfy the abovementioned requirements, metals of low melting points are advantageously employed. Although several metals of melting points below 1,000° C. are recommended, an aluminum having the melting point of 660° C. is most suitable because of the facts that such metal is safe in the production and use thereof and even when the metal oxidizes, the aluminum oxide has a high refractoriness.

Commercially available aluminum powders include flaky powder and atomized powder. The former presents a flaky form and the latter presents a spherical form. Since the purpose of the metal powder is to exhibit the particle bonding function in the matrix of the refractory brick when the additive metal softens or melts and come to contact with the refractory component or components, the flaky metal powder is more preferable than the atomized powder for the reason that the flaky powder forms a substantially continuous network in the refractory matrix whereas the atomized powder is dotted in the refractory matrix. And since it is necessary that the additive metal be uniformly dispersed in the refractory composition, the additive metal is preferably in the form of fine powder.

The process for producing refractories according to the present invention will be now described. First of all, refractory material, metal powder and thermo-setting resin binder in required amounts are admixed in a mixer. In this case, it is desirable that the refractory material powder and metal powder are previously mixed together before the thermo-setting resin binder is mixed with the other two components in the mixer so that the metal powder can be uniformly dispersed in the refractory material. The resulting mixture is molded in a mold press or cast if the intended refractory has a complicate shape. The molded or cast mixture is then subjected to heat-treatment at a temperature above 100° C. to thereby obtain the refractory of the invention.

The particle size range of the refractory material is optionally selected depending upon specific applications and application conditions of the refractory.

The additive metal powder is preferably employed in an amount within the range of 1–30% by weight based on the total weight of the refractory material. When the additive metal powder is employed in amounts below 1% by weight based on the total weight of the refractory material, any appreciable advantage cannot be obtained and on the other hand, if the additive metal is employed in amounts in excess of 30% by weight based on the total weight of the refractory material, when the refractory is employed in a device where metal is processed under high temperature conditions, the additive metal softens or melts away by the heat of the molten metal flow to be processed whereby the refractory is damaged. As mentioned hereinabove, the additive metal is preferably aluminum in the form of flaky powder and the most suitable amount of the additive metal is in the range of 5 to 10% by weight based on the total weight of the refractory material.

Although the amount of the thermo-setting organic binder in the refractory depends upon a specific bulk specific gravity of the refractory, the binder is preferably employed in the range of 2–15% by weight based on the total weight of the refractory material. When the amount of the binder is less than 2% by weight based on the total weight of the refractory material, the refractory can not be formed as a brick and on the other hand, when the amount of the binder exceeds 15% by weight based on the total weight of the refractory material, the molding of the refractory into a brick encounters difficulty and the obtained refractory has a coarse structure due to increase in the amount of volatile matter resulting in insufficient acid resistivity and strength.

The effect of the additive metal on the modulus of rupture of refractory is shown in the accompanying drawing.

Test refractory samples were prepared by admixing the refractory material consisting of 40% by weight of synthetic mullite and 60% by weight of sintered alumina based on the total weight of the refractory material, respectively, 5–7% by weight of phenol resin based on the total weight of the refractory material and 5% or 10% by weight of aluminum flaky powder based on the total weight of the refractory material or without aluminum flaky powder, respectively, molding the resultant mixture in a molding press and heat-treating the mold product at 200° C. for 24 hours.

As clear from the drawing, the refractory having no aluminum added thereto exhibited an insufficient modulus of rupture as the temperature increased whereas the refractories having aluminum added thereto began to increase the modulus of rupture at a value in the vicinity of the melting point of aluminum as the temperature increased. The addition of aluminum to refractories imparts a sufficient strength to the refractories in the bonding strength deterioration temperature range of the organic binder employed. In other words, the hot abrasion-resistance of the refractory was improved with the addition of aluminum. And in the temperature range of the melting point of aluminum to a higher value, the additive metal softened or melted to clog the air voids in the refractory brick to thereby deter the oxidation of the brick. In the prior art unburnt brick employing the organic binder, there was the disadvantage that the side of the refractory brick opposite from the side facing the furnace charge decreases strength due to the decomposition by oxidation as the modulus of rupture deteriorated. However, the refractory of the present invention eliminated the disadvantage. Furthermore, the bonding mode of the binder in the refractory of the present invention is different from that of the binder in the prior art burnt refractory and depends upon the friction between the refractory material having a high stress relief property and the softened or molten additive metal to thereby make it possible to obtain a refractory of excellent spalling-resistance.

As described hereinabove, the refractory of the present invention has substantially improved properties over those of the prior art unburnt refractory brick employing the organic binder and has no adverse effect on the quality of steel charge to be processed in a refining furnace where the refractory of the invention is employed. And since the refractory of the invention requires the burning at a relatively low temperature, the present invention attains energy saving and after the refractory has been used in excess of its designed service life, the refractory is broken into pieces and reused as the refractory material through a conventional treatment resulting in resource saving.

The refractories of the present invention find their application in refractory linings of converters, electric arc furnaces, torpedo cars, ladles and refining furnaces, plates and nozzles for sliding nozzles and submerged nozzles for continuous casting. Some examples of the application will be given hereinbelow.

The present invention will be illustrated by the following examples which illustrate the present invention, but do not limit the scope of the invention in any way.

EXAMPLE 1

To be used as the nozzle forming the lower portion of a sliding nozzle system, a refractory was prepared by admixing the refractory material consisting of synthetic mullite and sintered alumina in the mixing ratio as shown in the following Table, 7% by weight of aluminum flaky powder and 6% by weight of phenol resin binder based on the total weight of the refractory material, respectively.

The obtained refractory exhibited the same service life and corrosion-resistance as those the prior art burnt refractory had and showed no spalling.

EXAMPLE 2

To be used as a ceiling brick in a 100 ton electric arc furnace, a refractory was prepared by admixing the refractory material consisting of magnesia and flaky graphite in the mixing ratio as shown in the following Table, 8% by weight of aluminum and 5% by weight of phenol resin binder based on the total weight of the refractory material, respectively. For comparison purpose, a control unburnt refractory brick employing the same composition as the refractory of Example 2 was prepared, but the control still presented the problem that the brick decreases strength due to decarbonation on the side opposite from the furnace charge facing side.

In the refractory of Example 2, a decarbonization layer of about 5 mm thickness was formed on the side of the refractory brick opposite from the side facing the furnace charge, but did not form any brittle layer therein.

EXAMPLE 3

To be used as a lining refractory on a torpedo car, a refractory was prepared by admixing the refractory material consisting of synthetic mullite, sintered alumina and flaky graphite in the mixing ratio as shown in the following Table, 7% by weight of aluminum and phenol resin binder based on the total weight of the refractory material, respectively.

The lining refractory exhibited the corrosion-resistance equivalent to or better than that of the prior art burnt refractory even in the portion thereof where the refractory was easily subjected to damage by the slag line and molten pig iron flow.

EXAMPLE 4

To be used as a lining refractory on a 150 ton ladle, a refractory was prepared by admixing the refractory material consisting of pyrophilite and fireclay in the mixing ratio shown in the following Table, 6% by weight of flaky powder and 6% by weight of phenol resin binder based on the total weight of the refractory material, respectively. The lining refractory was applied to the wall of a furnace.

The lining refractory exhibited an excellent corrosion-resistance and showed no slag permeation on the side facing the furnace charge and no weakness on the side opposite from the furnace charge facing side.

TABLE

| | (% by weight) | | | |
|---|---|---|---|---|
| | Example 1 | Example 2 | Example 3 | Example 4 |
| Synthetic mullite (coarse particle) | 20 | — | 20 | — |
| Synthetic mullite (medium particle) | 20 | — | 20 | — |
| Sintered (medium particle) | 30 | — | 10 | — |
| alumina (fine particle) | 30 | — | 30 | — |
| Magnesia (coarse particle) | — | 40 | — | — |
| Magnesia (medium particle) | — | 20 | — | — |
| Magnesia (fine particle) | — | 20 | — | — |
| Pyrophilite (coarse particle) | — | — | — | 30 |
| Pyrophilite (medium particle) | — | — | — | 30 |
| Pyrophilite (fine particle) | — | — | — | 30 |
| Flaky graphite | — | 20 | 10 | — |
| Fire-clay | — | — | 10 | 10 |
| Aluminum | +7 | +8 | +7 | +6 |
| Phenol resin | +6 | +5 | +6 | +6 |
| Apparent specific gravity (g/cm$^3$) | 3.13 | 2.90 | 2.88 | 2.51 |
| Bulk specific gravity (g/cm$^3$) | 2.78 | 2.70 | 2.60 | 2.23 |
| Apparent porosity (%) | 11.3 | 6.8 | 9.6 | 11.0 |
| Compressive strength (kg/cm$^2$) | 704 | 385 | 708 | 441 |
| Modulus of rupture at room temperature (kg/cm$^2$) at 1400° C. | 188 | 154 | 146 | 81 |
| | 210 | 149 | 151 | 124 |

Note:
Quality properties were determined after heat-curing at 200° C.

While several embodiments of the invention have been described in detail, it will be understood that the same are for illustration purpose only and not to be taken as a definition of the invention, reference being had for this purpose to the appended claims.

What is claimed is:

1. A spalling- and corrosion-resistant refractory for steel making furnaces and casting pits comprising the composition of refractory material consisting essentially of one or more refractory inorganic substances, 1–30% by weight of aluminum powder having a particle size below 0.5 mm, and 2–15% by weight of thermo-setting organic resin binder based on the total weight of said refractory material, respectively, and prepared by mixing, kneading, molding into bricks and burning said composition at a temperature below 800° C.

2. The spalling- and corrosion-resistant refractory for steel making furnaces and casting pits as set forth in claim 1, in which said thermo-setting organic resin binder is phenol resin.

* * * * *